United States Patent [19]

Takahashi

[11] Patent Number: 4,747,659
[45] Date of Patent: May 31, 1988

[54] OPTICAL FIBER CONNECTOR

[75] Inventor: Mitsuo Takahashi, Matsudo, Japan

[73] Assignee: Seikoh Giken Co., Ltd., Matsudo, Japan

[21] Appl. No.: 844,317

[22] Filed: Mar. 26, 1986

[30] Foreign Application Priority Data

Apr. 2, 1985 [JP] Japan .................................. 60-69495

[51] Int. Cl.$^4$ ................................................ G02B 6/38
[52] U.S. Cl. .................... 350/96.21; 350/96.20
[58] Field of Search .............. 350/96.20, 96.21, 96.22

[56] References Cited

U.S. PATENT DOCUMENTS

| 3,936,143 | 2/1976 | Sato | 350/96.21 |
| 4,205,896 | 6/1980 | Borsuk | 350/96.21 X |
| 4,398,797 | 8/1983 | Wedertz et al. | 350/96.21 |
| 4,553,814 | 11/1985 | Bahl et al. | 350/96.21 |

FOREIGN PATENT DOCUMENTS

| 0113009 | 9/1980 | Japan | 350/96.21 |
| 0006909 | 1/1985 | Japan | 350/96.21 |
| 2020056 | 11/1979 | United Kingdom | 350/96.21 |

*Primary Examiner*—John Lee
*Assistant Examiner*—John Ngo
*Attorney, Agent, or Firm*—Spencer & Frank

[57] ABSTRACT

An optical fiber connector according to the present invention is of the type in which optical fibers are inserted into a pair of ferrules which in turn are forcibly inserted into a sleeve so that the end surfaces of the optical fibers are in contact. The fiber misalignment, or disagreement of the centers of the optical fiber cores, may be corrected by relating a ferrule supporting plug while the ferrules are disposed in a sleeve adapter which holds the sleeve.

18 Claims, 3 Drawing Sheets

OPTICAL FIBER CONNECTOR

BACKGROUND OF THE INVENTION

This invention relates to an optical fiber connector for communication purpose, and more particularly to an optical fiber connector which can easily and precisely correct any disagreement in the optical axes of optical fiber cores respectively inserted into a pair of ferrules.

An optical fiber consists of a cylindrical core forming a path for light and a cladding fittingly and concentrically surrounding the outer periphery of the core. The core and the cladding are made of glass of different refractive index.

When an optical signal is connected with the core, the signal is reflected by the cladding due to the light refractive index difference from that of the core. Thus, the brightness of the light is not attenuated by outward diffusion, and the optical signal may be transmitted for a long distance. However, the length of a fiber is limited when the fiber is manufactured, and so many connecting portions arise even for a single circuit.

For connecting the optical fibers, the end surfaces of the fibers may be heated to a very high temperature and welded with each other, or an optical fiber connector may be used.

FIG. 1 is a sectional view showing an example of a conventional optical fiber connector. In the figure, the reference numerals 1, 1a denote optical fibers, 2, 2a denote ferrules and 3 denotes a sleeve. In the conventional optical fiber connector that is shown, a pair of optical fibers 1 and 1a to be connected with each other are beforehand bonded and fixed to the respective holes bored at the centers of ferrules 2, 2a. The end surfaces 4, 4a of the ferrules 2, 2a are polished into mirror faces and then they are forcibly inserted into the sleeve 3, so that the optical axes of the two facing optical fibers 1 and 1a precisely agree with each other.

In order to avoid any attenuation of brightness of the optical signal, the diameter of the core of the optical fiber 1 or 1a is extremely minute in size. For example, in the case of a single mode type optical fiber for long-distance use, it may be only 10 microns. Even for a multi-mode type optical fiber for middle- and short-distance use, 50 micron fiber has generally been used. The diameter of the cladding in either case is 125 microns.

Even with the connecting method using an optical fiber connector, loss of light at the connection cannot be avoided. The largest cause for this loss at the connection is fiber misalignment, or the positional disagreement between the centers of the pair of optical fiber cores.

FIG. 2 is an enlarged view of a section of the conventional optical fiber connector shown in FIG. 1, cut transverse to the axis of the connector of FIG. 1.

In FIG. 2, the core and the cladding of the optical fiber 1 are resepectively given by 1A and 1B. The cladding 1B is made integral with the optical fiber core 1A. When a pair of fibers 1, 1a are connected, the respective optical fibers 1, 1a are inserted into holes 5 bored in ferrules 2 and bonded thereto respectively and then they are forcibly inserted into the sleeve 3.

Causes for the positional disagreement between the centers of the optical fiber cores may be listed as follows:

(A) Causes from optical fibers.

1. Disagreement between the center of the core and the circumference of the cladding... 1 micron; and
2. Disagreement caused by the error in size of the outer diameter of the cladding... 1 micron.

(B) Causes from ferrules

1. Disagreement caused by an error in the size of the hole of the ferrule... 1 micron;
2. Disagreement between the center of the hole of the ferrule and the outer diameter... 2 microns; and
3. Disagreement between the diameters of a pair of ferrules... 1 micron.

There has been a possibility of disagreement of five microns in a single ferrule, and 11 microns at the maximum when a pair of ferrules are inserted into a sleeve. In the case of an optical fiber core of 10 microns, for example, the two cores would be completely displaced. And in the case of a 50 micron fiber core, the light transmitting surfaces would overlap by only 70% and the loss at the connection would reach about 2 dB, so that the desirable value of 1 dB could not be attained.

Various proposals have been made for avoiding the disagreement between the centers of the optical fiber cores.

One of such proposals is to raise the accuracy in the size of the ferrule itself. However, improving the accuracy in size would be extremely expensive, and also mass-production of such good ferrules would be difficult. Furthermore, any error inherent in the optical fibers themselves could not be curred.

One method has been proposed for solving this problem. According to it, after an optical fiber has been inserted into a ferrule, the loss at the connection is measured while the fibers are connected. Then the ferrule is rotated to find out the position of the lowest connection loss and then the position is locked, for example, with a positioning key, etc. Thus the relative phase relation between the pair of ferrules are determined. However, in view of the high precision required in manufacturing an optical fiber connector of very minute size, few grooves may at most be formed in the positioning key. It has not been easy to provide continuous adjustment with the positioning key, and precise correction could thus not be expected.

SUMMARY OF THE INVENTION

An object of this invention is to provide an optical fiber connector which enables an easy and precise correction of the disagreements between the centers of optical fiber cores mounted in a pair of ferrules.

An optical fiber connector according to the present invention is of the type in which optical fibers are inserted into a pair of ferrules which in turn are forcibly inserted into a sleeve so that the end surfaces of the optical fibers are in contact. The connector according to one embodiment of the present invention comprises a sleeve holding member which holds the sleeve, a detachable member detachably mounted to the sleeve holding member, a ferrule supporting member rotatably provided with respect to the detachable member, the ferrule being rotatable integrally with the supporting member and being movable in the axial direction with respect to the supporting member, an urging member which urges the ferrule in a direction to contact the end surface of another ferrule in the sleeve, and a locking member which locks the ferrule supporting member in a position on the detachable member. After mounting the detachable member on the sleeve holding member, the ferrule supporting member is rotated, thus enabling a continuous adjustment of the disagreement between the optical axes of the pair of optical fibers, and then the adjusted position is locked with the locking member.

An optical fiber connector according to another embodiment of the present invention may comprise a sleeve holding member which holds the sleeve; a detachable member detachably mounted to the sleeve holding member and urging the ferrule in a direction for the end surface of the ferrule to contact the end surface of another ferrule in the sleeve; a ferrule supporting member rotatably provided with respect to the detachable member and rotating integrally with the ferrule; a holding member for holding the ferrule supporting member, which allows movement of the ferrule supporting member only in its axial direction; and a locking member which locks the ferrule supporting member in position on the detachable member. After mounting the detachable member on the sleeve holding member, the ferrule supporting member is rotated and the end surfaces of the ferrules are urged together, thus enabling a continuous adjustment of the disagreement between the optical axes of the pair of optical fibers, and then the adjusted position is locked with the locking member.

DESCRIPTION OF THE PREFERRED EMBODIMENTS

The preferred embodiments according to the present invention will be explained with reference to the drawings.

Figure 3:
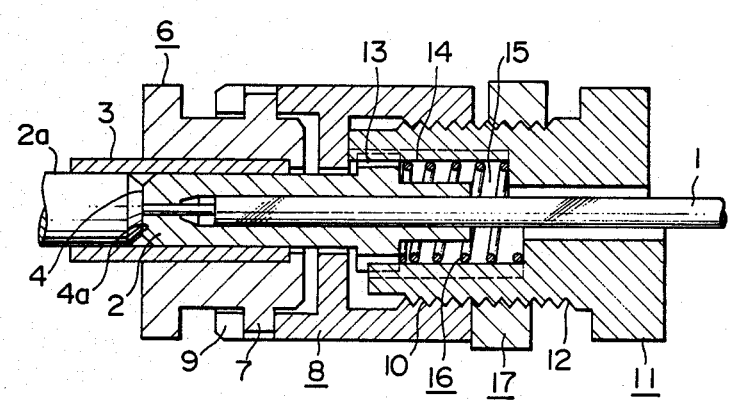
FIG. 3 is a cross-sectional view of a first embodiment of an optical fiber connector according to the present invention.

In FIG. 3, the upper half shows the state of a plug 11 when it is fully screwed in, and the lower half of the figure shows the state after correction of the centers of the optical fiber cores has been finished.

Figure 1:
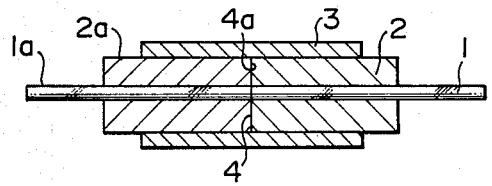
FIG. 1 is a cross-sectional view of a conventional optical fiber connector.
Figure 2:
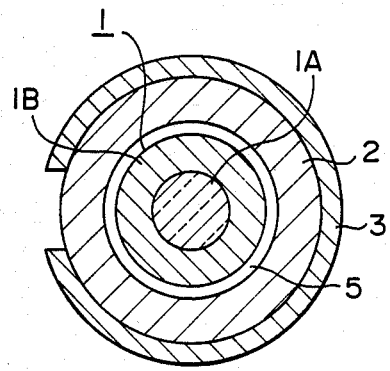
FIG. 2 is an enlarged view of the section of the conventional optical fiber connector shown in FIG. 1.

The optical fiber connector shown in FIGS. 3, 4(a), 4(b) and 4(c) is of a bayonet type. The same reference numerals used in the explanation of FIGS. 1 and 2 are used for indicating the identical elements in this embodiment.

The reference numeral 6 denotes a sleeve adapter. 8 is a detachable nut, 11 is a plug, 16 is a pressure spring and 17 a lock nut.

Figure 4A:
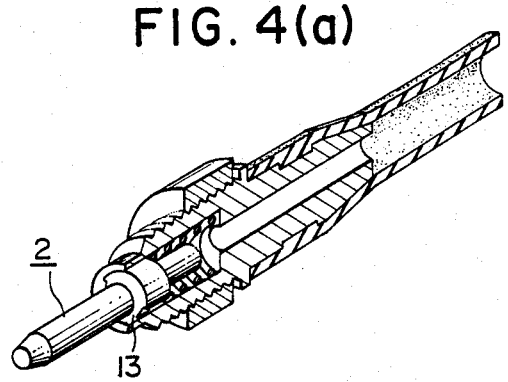
FIGS. 4(a), 4(b) and 4(c) are perspective views of the first embodiment of the optical fiber connector according to the present invention shown in FIG. 3, FIGS. 4(a) through 4(c) being exploded views of portions of the connector.
Figure 4B:
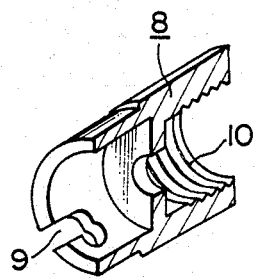
Figure 4C:
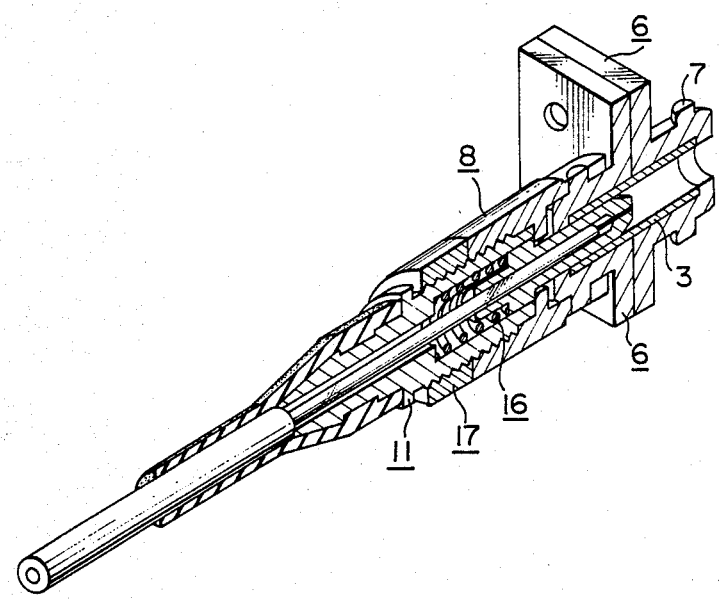

The sleeve adapter 6 holds the sleeve 3 and has a protrusion 7 to form a bayonet nail, as shown in FIG. 4(c). The detachable nut 8 is provided with a bayonet groove portion 9 and a screw portion 10, as shown in FIG. 4(b). The detachable nut 8 is mounted to the sleeve adapter 6 by engaging the protrusion 7 with the groove of portion 9 of the detachable nut 8. The plug 11 is provided with a screw portion 12, engaging means 14 and a stepped through hole 15. The screw portion 12 engages with the screw portion 10 of the detachable nut 8. The engaging means 14 engages with engaging means 13 provided in a flange portion of the ferrule 2, so that they engage with each other in the rotational direction. Engagement between 13 and 14 is made in the form of a groove and a protrusion. The ferrule 2 is inserted into the stepped through hole 15 and the pressure spring 16. The lock nut 17 locks the positions of the detachable nut 8 and the plug 11 after the correction of the disagreement of the fiber cores is made.

The actual correction by the above-mentioned members will now be explained.

At first, the plug 11 is screwed into the detachable nut 8 until the plug contacts the nut 8 and stops. At this stage, the detachable nut 8 is mounted on the sleeve adapter 6. By using a measuring machine, not shown, the plug 11 is threaded back while being rotated until the measuring machine measures the minimum connection loss between the optical fibers 1 and 1a. At this position of minimum connection loss, the detachable nut 8 and the plug 11 are locked with the lock nut 17. The connecting surface 4 of the ferrule 2 is urged by the pressure spring 16 so that it always contacts with the contact surface 4a of the ferrule 2a.

Figure 5A:
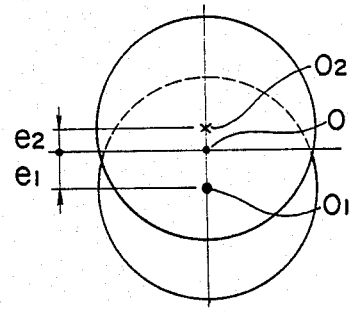
FIGS. 5(a) and 5(b) are views for explaining the principle of correction for the optical fiber connector according to the present invention.

FIG. 5(a) shows the state before correction. In this figure, the center of the hole of the sleeve 3, and the centers of the optical fiber cores of the ferrules 2 and 2a, are respectively given by O, $O_1$ and $O_2$. Assume that the centers $O_1$ and $O_2$ are displaced at the points $e_1$ and $e_2$, respectively, with a phase lag of 180°.

Figure 5B:
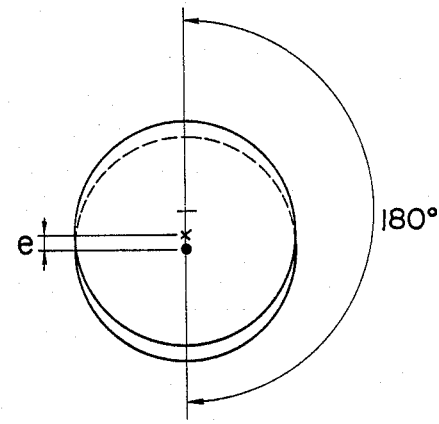

FIG. 5(b) shows the state after correction. One of the ferrules has been rotated by 180° for correction. If the difference of the optical axes of the optical fiber cores is given by e, it satisfies the equation $e = e1 - e2$. The largest rotational angle of correction is 360° and the maximum correction angle for each ferrule is 180°. When a large correction angle is required, the optical fibers might be twisted. In order to avoid this, a rough adjustment must beforehand be made after detaching the detachable nut 8 before the precise correction as mentioned above.

Figure 6:
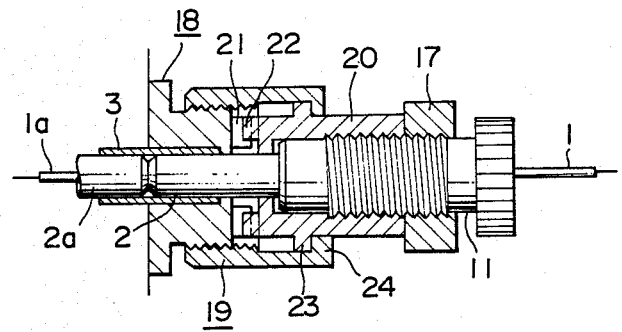
FIG. 6 is a cross-sectional view of a second embodiment of an optical fiber connector according to the present invention.

FIG. 6 is a cross-section of the second embodiment of the optical fiber connector according to the present invention.

In the second embodiment, the sleeve adapter 18 is engaged with a cap nut 19 by screws threaded in the respective members. Reference numeral 20 denotes a plug sleeve. The plug 11 is threaded into the plug sleeve 20. A groove 21 is provided in the sleeve adapter 18 and a protrusion 22 is provided at the end surface of the plug sleeve 20, with the groove 21 and the protrusion 22 engaging in the rotational direction. Around the outer periphery of the plug sleeve 20 is provided a flange 23, which contacts with a flange 24 provided to the cap nut 19.

The correction of disagreement of the centers according to the second embodiment of this invention will now be described.

The plug 11 is screwed all the way into the plug sleeve 20. At this stage, the sleeve 20 is mounted on the sleeve adapter 18 by the cap nut 19. By using a measuring machine, not shown, the state of connection is checked. The plug 11 is then rotated back. At the position for the minimum connection loss, checked by the measuring machine, the sleeve and the plug 11 are locked in position by the locking nut 17, so that the sleeve 20, plug 11 and the ferrule 2 are made integral at this stage. By rotating the cap nut 19, the contact surface 4 of the ferrule 2 and the surface 4a of the ferrule 2a are urged to contact with each other. The sleeve 20 moves only in the axial direction with respect to the sleeve adapter 18, its movement in the rotational direction being stopped by the engagement between the groove 21 and the protrusion 22, so that the adjusted rotational angle does not change.

As fully described heretofore, the optical fiber connector according to the present invention provides a simple structure for correction. According to the embodiments of the optical fiber connectors of this invention, the disagreement of the optical fiber cores may be corrected by rotation of the plug while the optical fibers are mounted to the sleeve adapter. Thus, the correction of the disagreement of the optical axes of a pair of optical fiber cores may be made continuously and the best value for the correction can be achieved, enabling more precise correction than any conventional stepwise correction method.

In particular, in the case of an bayonet type detachable optical fiber connector as in the first embodiment of this invention, the correction of the disagreement of the optical axes of the optical fiber cores has conventionally not been possible at all. Only the present invention can provide such a correction with the detachabel type.

What is claimed is:

1. An optical fiber connector of the type in which optical fibers are inserted into a pair of ferrules and the ferrules are inserted into a sleeve, the ferrules holding the ends of the optical fibers together, comprising:
    a sleeve holding member which holds the sleeve;
    a detachable member detachably mounted to the sleeve holding member;
    a ferrule supporting member rotatably mounted with respect to the detachable member, one of the ferrules rotating integrally with the ferrule supporting member and being movable with respect to the ferrule supporting member only in its axial direction;
    an urging member which urges said one of the ferrules in a direction so that the end surface of said one of the ferrules contacts the end surface of the other ferrule; and
    a locking member which locks the ferrule supporting member in a position on the detachable member,
    so that after mounting the detachable member on the sleeve holding member, the ferrule supporting member may be rotated, thus enabling a continuous adjustment to reduce misalignment between the optical axes of the optical fibers, the adjusted position then being locked with the locking member.

2. An optical fiber connector according to claim 1, wherein the urging member is a pressure spring.

3. An optical fiber connector according to claim 1, wherein one of said ferrule supporting member and said one of the ferrules is provided with a groove and the other of said ferrule supporting member and said one of the ferrules is provided with a projection, said projection slidably engaging said groove to key said one of the ferrules to said ferrule supporting member.

4. An optical fiber connector of the type in which optical fibers are inserted into a pair of ferrules and the ferrules are inserted into a sleeve, the ferrules holding the ends of the optical fibers together, comprising:
    a sleeve holding member which holds the sleeve;
    a detachable member detachably mounted to the sleeve holding member and urging one of the ferrules in a direction to contact the end surface of the other ferrule;
    a ferrule supporting member rotatably mounted with respect to the detachable member, said one of the ferrules rotating integrally with the ferrule supporting member;
    a holding member for holding the ferrule supporting member, which allows the movement of the ferrule supporting member only in its axial direction; and
    a locking member which locks the ferrule supporting member in a position on the detachable member;
    so that after mounting the detachable member on the sleeve holding member, the ferrule supporting member may be rotated and the end surfaces of the ferrules may be urged together, thus enabling a continuous adjustment to reduce misalignment between the optical axes of the optical fibers, the adjusted position then being locked with the locking member.

5. An optical fiber connector according to claim 4, wherein one of said members is provided with a groove and another of said members is provided with a projection which slidably engages said groove.

6. An optical fiber connector for connecting first and second fibers end-to-end, comprising:
    a sleeve;
    a first ferrule having an inner end and a bore communicating with the inner end, the first fiber being secured in the bore of the first ferrule and the inner end of the first ferrule being disposed in the sleeve;
    a second ferrule having an inner end and a bore communicating with the inner end, the second fiber being secured in the bore of the second ferrule and the inner end of the second ferrule being disposed in the sleeve to face the inner end of the first ferrule, the second ferrule additionally having an outer portion which extends outside the sleeve;
    a ferrule supporting member having screw threads and having a cavity into which the outer portion of the second ferrule extends;
    biassing means for biassing the second ferrule out of the cavity;
    keying means for permitting the second ferrule to move linearly but not rotationally with respect to the ferrule supporting member;
    a nut having screw threads which engage the screw threads of the ferrule supporting member so that the position of the ferrule supporting member with respect to the nut can be adjusted; and
    connecting means for connecting the nut to the sleeve.

7. An optical fiber connector according to claim 6, wherein the cavity is a stepped-through hole having a shoulder, and wherein the biassing means comprises a spring having an end which engages the shoulder and having an end which engages the second ferrule.

8. An optical fiber connector according to claim 6, wherein the keying means comprises a projection provided on one of the second ferrule and the ferrule supporting member and a groove provided on the other of the second ferrule and the ferrule supporting member, the projection slidably engaging the groove.

9. An optical fiber connector according to claim 8, wherein the projection is provided on the second ferrule and the groove is provided on the ferrule supporting member, inside the cavity.

10. An optical fiber connector according to claim 6, wherein the connecting means comprises a sleeve adapter attached to the sleeve and means for detachably connecting the nut to the sleeve adapter.

11. An optical fiber connector according to claim 6, wherein the connecting means comprises a sleeve adapter having a bayonet protrusion, and means integral with the nut for providing a bayonet groove to engage the bayonet protrusion.

12. An optical fiber connector according to claim 6, further comprising locking means for locking the ferrule supporting member to the nut.

13. An optical fiber according to claim 12, wherein the locking means comprises another nut having screw threads which engage the screw threads of the ferrule supporting member, the another nut being rotatable into pressing contact with the nut.

14. An optical fiber connector for connecting first and second fibers end-to-end, comprising:

a sleeve;

a first ferrule having an inner end and a bore communicating with the inner end, the first fiber being secured in the bore of the first ferrule and the inner end of the first ferrule being disposed in the sleeve;

a second ferrule having an inner end and a bore communicating with the inner end, the second fiber being secured in the bore of the second ferrule and the inner end of the second ferrule being disposed is the sleeve to face the inner end of the first ferrule, the second ferrule additionally having an outer portion which extends outside the sleeve;

a ferrule supporting member having screw threads, the second ferrule being fixedly connected to the outer portion of the second ferrule;

a sleeve member having screw threads which engage the screw threads of the ferrule supporting member so that the position of the ferrule supporting member with respect to the sleeve member can be adjusted;

mounting means, operationally connecting the sleeve and the sleeve member, for drawing the sleeve member toward the sleeve; and keying means for permitting the sleeve member to move linearly but not rotationally with respect to the sleeve as the sleeve member is drawn toward the sleeve.

15. An optical fiber connector according to claim 14, wherein the mounting means comprises a sleeve adapter attached to the sleeve, and wherein the keying means comprises a projection provided on one of the sleeve adapter and the sleeve member and a groove provided on the other of the sleeve adapter and the sleeve member, the projection slidably engaging the groove.

16. An optical connector according to claim 14, wherein the mounting means comprises a sleeve adapter having screw threads, a cap nut having screw threads which engage the screw threads of the sleeve adapter, the cap nut additionally having an opening through which the sleeve member movably extends, and a flange affixed to the sleeve member for engagement by the cap nut.

17. An optical connector according to claim 14, further comprising locking means for locking the ferrule supporting member to the sleeve member.

18. An optical connector according to claim 17, wherein said locking means comprises a nut having screw threads which engage the screw threads of the ferrule supporting member, the nut being rotatable into pressing contact with the sleeve member.

* * * * *